(No Model.)
R. A. THOMPSON.
SULKY PLOW.
No. 322,331. Patented July 14, 1885.
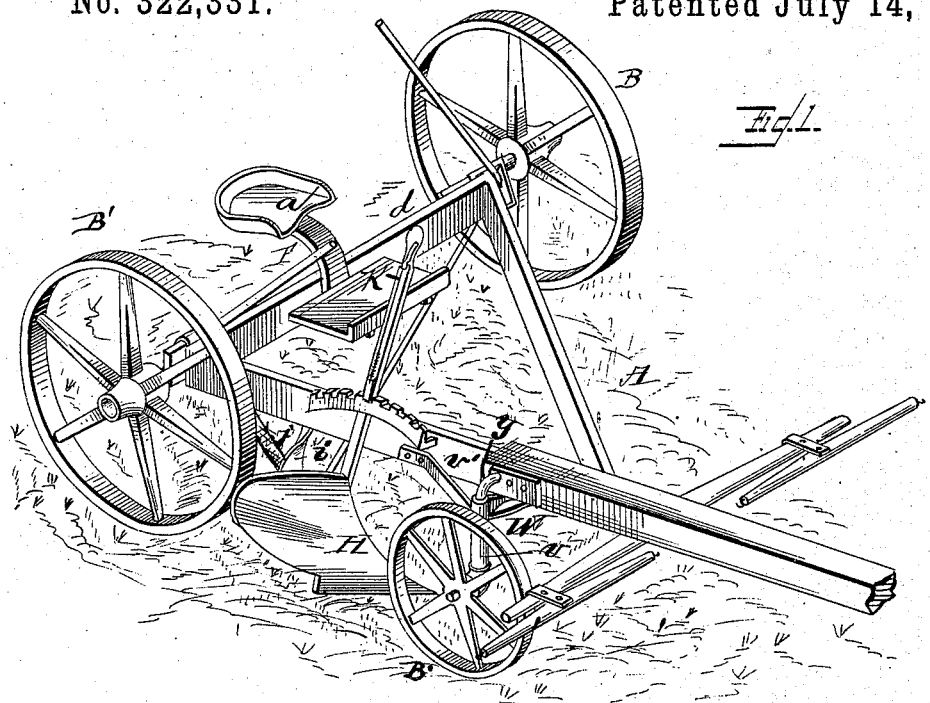
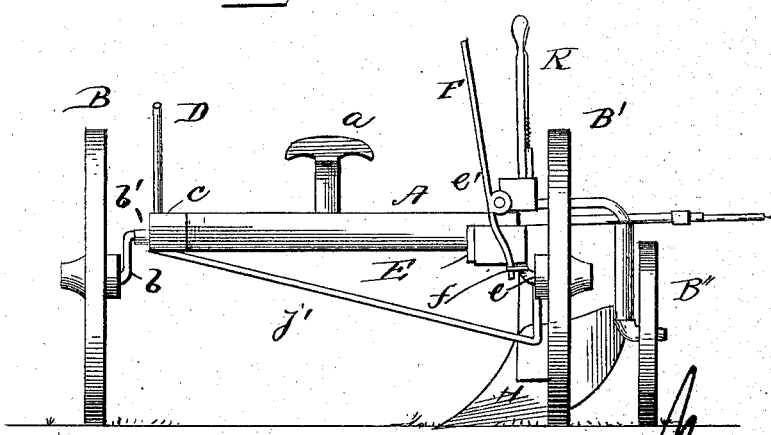
WITNESSES
F. L. Ourand
E. M. Johnson
INVENTOR
Robert A. Thompson
Attorney
N. PETERS. Photo-Lithographer, Washington, D. C.

UNITED STATES PATENT OFFICE.

ROBERT A. THOMPSON, OF MONTROSE, MISSOURI.

SULKY-PLOW.

SPECIFICATION forming part of Letters Patent No. 322,331, dated July 14, 1885.

Application filed April 23, 1885. (No model.)

*To all whom it may concern:*

Be it known that I, ROBERT A. THOMPSON, a citizen of the United States of America, residing at Montrose, in the county of Henry and State of Missouri, have invented certain new and useful Improvements in Sulky-Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in wheel-plows, the same being designed more especially as an improvement upon my Patent No. 293,818, dated February 19, 1884. My present invention consists in the construction and combination of the parts, as will be hereinafter fully described, and specifically pointed out in the claim.

In the drawings, Figure 1 is a perspective view of my improvement. Fig. 2 is a rear elevation of the same, constructed in accordance with my invention.

A represents a right-angle triangular frame, to the rear portion of which is attached the driver's seat $a$, which is suitably mounted thereon. The ends of the rear portion, $d$, of the frame have attached thereto wheels B B'. The wheel B is secured to a crank-axle, $b$, which is journaled in a socket, $b'$, which is securely attached to an angle iron or casting, $c$, which is attached to the corner of the frame A. The end of this crank-axle $b$ is attached to a lever, D, and by turning the same the crank-axle is moved so that the wheel will occupy different planes with respect to the frame. The lever is provided with an ordinary ratchet-bar for holding the same in position. The wheel B' on the opposite corner of the frame is attached to a curved stub-axle, $e$, which is secured to a horizontally-sliding block, E, which moves in a socket, $e'$, attached to the corner of the frame. A loop or bail, $f$, is secured to the stub-axle $e$ near the end of the sliding block, and a pivoted lever, F', engages with said bail, and by the movement of said lever the wheel is moved horizontally to and from the frame.

At the point or front end of the frame A is secured a whiffletree, $w$, also a sidewise-projecting bar, W, with a vertically-depending portion, $v$, which is braced by a bar, $v'$. The depending portion $v$ is formed into a socket for the reception of a vertical portion of a bar, $y$, the upper end of which is bent at right angles and attached to a plate which is firmly secured to the end of the tongue. The lower end of the bar $y$ is bent at right angles from the socket $v$, and formed into a stub-axle, to which a wheel, B'', is attached.

The plow H is pivotally secured to a horizontal socket, which is formed in a standard, $i$, which is rigidly secured to the frame, and this standard is braced by bars $j\,j'$, which extend from said standards to the corners of the frame.

The side of the frame adjacent to which the standard $i$ is secured is provided with a rack-bar, $k$, with which the lever K engages, the lower portion of this lever being rigidly attached near the landside of the plow, and by moving said lever the point of the plow is either raised or depressed.

It will be readily noticed that the pole of the improved plow is attached to the swinging wheel B'', so that said wheel will readily turn so as to be on a line with the draft, thus making it easy to turn the implement at right angles; also, that by adjusting the off wheel, B, the angle of the plow will be changed, and the wheel B' can be adjusted inwardly and outwardly so as to travel in the furrow.

I claim—

The combination, in a wheel-plow, of a triangular frame, rear wheels, B B', one of said wheels being mounted on the crank-axle, a lever connected to said crank-axle for adjusting the same vertically, the other wheel being connected to the curved axle, and a lever for adjusting the same laterally, a plow pivoted to a standard which depends from the frame, and a lever for holding said plow in position, and a wheel located at one side of the front portion of the triangular frame and adjustable, as specified, substantially as set forth.

In testimony whereof I affix my signature in presence of two witnesses.

ROBERT A. THOMPSON.

Witnesses:
L. P. KLUTTS,
J. B. MACKAY.